United States Patent [19]
Koninsky et al.

[11] Patent Number: 4,811,184
[45] Date of Patent: Mar. 7, 1989

[54] SWITCH-MODE POWER SUPPLY WITH DYNAMIC ADJUSTMENT OF CURRENT SENSE MAGNITUDE

[75] Inventors: Peter M. Koninsky, Mount Laurel; Emilio F. D'Ariano, Vincentown, both of N.J.

[73] Assignee: General Electric Company, Moorestown, N.J.

[21] Appl. No.: 192,268

[22] Filed: May 10, 1988

[51] Int. Cl.[4] .................. H02M 3/156; H02M 3/337
[52] U.S. Cl. ...................................... 363/17; 323/281; 323/282; 363/25; 363/56
[58] Field of Search ................. 363/17, 25, 26, 53, 363/56; 323/282, 284, 285, 281; 361/110

[56] References Cited

U.S. PATENT DOCUMENTS

| | | | |
|---|---|---|---|
| 3,859,586 | 1/1975 | Wadlington | 363/25 |
| 4,020,423 | 4/1977 | Guyot et al. | 328/151 |
| 4,069,452 | 1/1978 | Conway et al. | 307/351 |
| 4,109,198 | 8/1978 | Uemo | 307/351 |
| 4,121,121 | 10/1978 | Gabeler | 307/358 |
| 4,144,544 | 3/1979 | Fernsler | 358/158 |
| 4,144,545 | 3/1979 | Fernsler et al. | 358/158 |
| 4,163,909 | 8/1979 | Harr | 307/351 |
| 4,282,014 | 8/1981 | Winkler et al. | 55/105 |
| 4,392,103 | 7/1983 | O'Sullivan et al. | 323/222 |
| 4,399,414 | 8/1983 | Bird | 328/151 |
| 4,423,457 | 12/1983 | Brajder | 361/86 |
| 4,453,193 | 6/1984 | Huang et al. | 361/98 |
| 4,524,412 | 6/1985 | Eng | 363/56 |
| 4,569,009 | 2/1986 | Genuit | 323/285 |
| 4,586,120 | 4/1986 | Malik et al. | 363/21 |
| 4,616,301 | 10/1986 | Small | 363/26 |
| 4,626,979 | 12/1986 | JaQuay | 363/41 |
| 4,686,617 | 8/1987 | Colton | 363/56 |
| 4,725,769 | 2/1988 | Cini et al. | 323/283 |

FOREIGN PATENT DOCUMENTS

| | | | |
|---|---|---|---|
| 10516 | 1/1977 | Japan | 363/25 |
| 133980 | 10/1981 | Japan | 323/285 |
| 85110 | 5/1982 | Japan | 323/281 |
| 159979 | 9/1983 | Japan | 363/53 |
| 47618 | 3/1984 | Japan | 323/282 |

OTHER PUBLICATIONS

Mumaw, "Programmable Regulator Card," IBM Tech. Discl. Bul., vol. 20, No. 6, p. 2180, Nov. 1977.

"Modelling and Analysis of Switching DC-to-DC Converters in Constant-Frequency Current-Programmed Moe" by HSU et al., published 1979 by IEEE; pp. 284–301.

Primary Examiner—William H. Beha, Jr.
Attorney, Agent, or Firm—Clement A. Berard, Jr.; William H. Meise

[57] ABSTRACT

In a dc-to-dc converter, alternating current or pulsating direct current produced by a cyclically switched power supply passes through semiconductor rectifiers or diodes. The rectifiers may be subject to unwanted conduction characteristics attributable to charge storage, which may result in cyclical current spikes during normal operation. A current sensor is coupled to sense a current which includes the cyclical spikes. A controllable attenuator or gain element couples the sensed current in a feedback loop to shut down the converter in the event of an overcurrent. To reduce the possibility of shut-down due to the normal cyclical current spikes, the attenuator or gain element is cyclically switched so as to reduce the sensitivity to the current spikes when they occur.

12 Claims, 5 Drawing Sheets

SWITCH-MODE POWER SUPPLY WITH DYNAMIC ADJUSTMENT OF CURRENT SENSE MAGNITUDE

BACKGROUND OF THE INVENTION

This invention relates to current-limited power supplies.

In many applications it is desirable to convert a primary direct voltage to another direct voltage in an efficient manner. This problem often arises in the context of electrical equipment powered by the primary direct voltage system of a vehicle. The primary direct voltage system of the vehicle is often a battery having a relatively low direct voltage, whereas the equipment to be powered may require a higher voltage or a lower voltage The abbreviation dc (direct current) is often used to denote a direct voltage. Where the equipment to be powered requires a lower voltage at high current, a dc-to-dc converter may be used to avoid unwanted power dissipation in a voltage dropping resistor. Where the desired output voltage is higher than the primary voltage, the dc-to-dc converter is also desirable.

One way to implement a dc-to-dc converter is to use the primary direct voltage to energize an oscillator to produce an alternating current (ac), and to drive the primary winding of a transformer with the ac. The secondary voltage of the transformer at the appropriate voltage level is rectified and filtered to produce the desired direct voltage. It has been found to be more efficient to apply the primary direct voltage to a switched inductor, either with or without a transformer. In order to minimize the physical sizes of the inductor and of the transformer (if used), the switching often occurs at frequencies much higher than the 50 or 60 Hertz (Hz) power line frequency For example, dc-to-dc converters are often used in television receivers to produce the kinescope ultor direct voltage, and are switched in synchronism with the 15,750 Hz television horizontal deflection. In other applications, converters operating at frequencies in the hundreds of kilohertz or higher are sometimes used.

It is often convenient to incorporate feedback regulation into a switching dc-to-dc converter to compensate for load and other variations. This may be accomplished by sensing the direct output voltage of the converter, comparing it with a reference voltage to produce an error voltage, and controlling a pulse width modulated (PWM) driver by means of the error voltage. The pulse width modulated driver, in turn, establishes the duty cycle or the ratio of the ON (conductive) time period to the period of the converter switch, which in turn establishes the amount of energy stored in the inductor during each cycle for transfer to the output circuit, and therefore establishes the output voltage.

Constant-frequency, current-programmed dc-to-dc converters are described in an article entitled "Modelling and Analysis of Switching DC-to-DC Converters in Constant-Frequency Current-Programmed Mode" by Hsu et al., published 1979 by IEEE, pages 284–301. In current-programmed converters, the switched reactance is made conductive by a clock signal, and a ramp current increases until the switched reactance is rendered nonconductive by a comparator which compares the ramp current with an error voltage derived from a comparison of the converter output voltage with a reference voltage. These converters have simpler transfer functions than voltage-programmed converters, and therefore are easier to filter for stability and reduced ripple.

In switched dc-to-dc converters, relatively high instantaneous currents may flow during portions of each operating cycle. Ordinarily, the magnitudes of these currents are well within the operating limits of the elements themselves. However, in the event of a fault such as excessive load (too low a load resistance) or a short-circuited load, the current in particular components of the dc-to-dc converter may exceed allowable limits, thereby resulting in destruction of at least portions of the converter. It is customary to protect against excessive load currents by providing current sensing circuits arranged in a feedback loop. The current sensing circuits respond to current above a predetermined level in order to turn off or shut down the dc-to-dc converter, either temporarily or permanently.

Ordinarily, the dc-to-dc converter includes one or more semiconductor rectifiers connected for receiving a pulsating or alternating current from the switched inductor, possibly by way of a transformer. Because of the high operating frequency required for minimizing the physical size of the inductors and the transformer (if used), charge storage in the rectifiers gives the rectifiers the ability to conduct in either the forward or reverse direction for a short period after a period of conduction. In some circuits, the charge storage in such rectifiers may produce a momentary current pulse during each operating cycle. The current sense circuit may respond to the current pulse as though it were caused by an overcurrent in the load, such as that attributable to a short-circuit, thereby resulting in shut-down of the converter.

In order to prevent dc-to-dc converter shut-down as a result of current spikes occurring during ordinary cyclical operation, it is common to connect a low-pass filter to the current sensor to average the spike on the current sense signal, as is described in U.S. Pat. No. 4,524,412 issued June 18, 1985 to Eng. A low-pass filter used in this fashion introduces a delay into the feedback loop which, especially in the case of current-programmed dc-to-dc converters, may adversely affect normal operation as well as shut-down operation. The effect of such filter capacitors on the current sense operation is ameliorated in the arrangement of U.S. Pat. No. 4,453,193 issued June 5, 1984 to Huang et al. by applying a synchronously-variable voltage to the reference input of the comparators. This prevents shut-down of the converter due to so much of the normal operation current spike as manages to pass through the low-pass filter. However, the Hunan et al. arrangement does not reduce the delay attributable to the use of filters in the current sense circuit path. A current limited power supply is desired which provides effective current limiting in spite of cyclical current spikes, and which does not require low pass filters which have a significant time delay in the current sense circuit path.

SUMMARY OF THE INVENTION

A current limited power supply includes an inductor adapted to be coupled to a load. A rectifier arrangement is coupled with the inductor to form a circuit combination by which current flowing in the rectifier arrangement can flow through the inductor. A controllable switch is coupled to the circuit combination and is adapted to be energized from a source of direct voltage for, during a first operating condition of a recurrent cycle, applying direct energizing potential to the circuit combination with a polarity which generates an average unidirectional current flow through the inductor. During a second operating condition of the recurrent cycle, no direct operating voltage is applied to the circuit combination by way of the controllable switch. A source of synchronizing signals is coupled to a control arrangement. The control arrangement is coupled to the controllable switch and includes a current limit signal input terminal. The control arrangement recurrently initiates the first operating condition at a recurrent first time in response to the synchronizing signals, and recurrently initiates the second operating condition in response to a current limit signal applied to the current limit signal input terminal. A current sense arrangement generates a current sense signal which represents the magnitude of the current flow through the current sense arrangement. A comparator is coupled to the current limit signal input terminal of the control arrangement. The comparator includes an input terminal, and compares a signal applied to the input terminal with a fixed reference signal for generating the current limit signal when the magnitude of the signal applied to the signal input terminal has a particular relationship to the magnitude of the reference signal. A coupling arrangement is coupled to the current sense arrangement and to the input terminal of the comparator for coupling the current sense signal to the input terminal of the comparator with a reference attenuation during at least the last portion of the first operating condition. The coupling arrangement further includes a controllable attenuator for attenuating the current sense signal relative to the reference attenuation for a period of time beginning at the first time.

DESCRIPTION OF THE INVENTION

Figure 1:
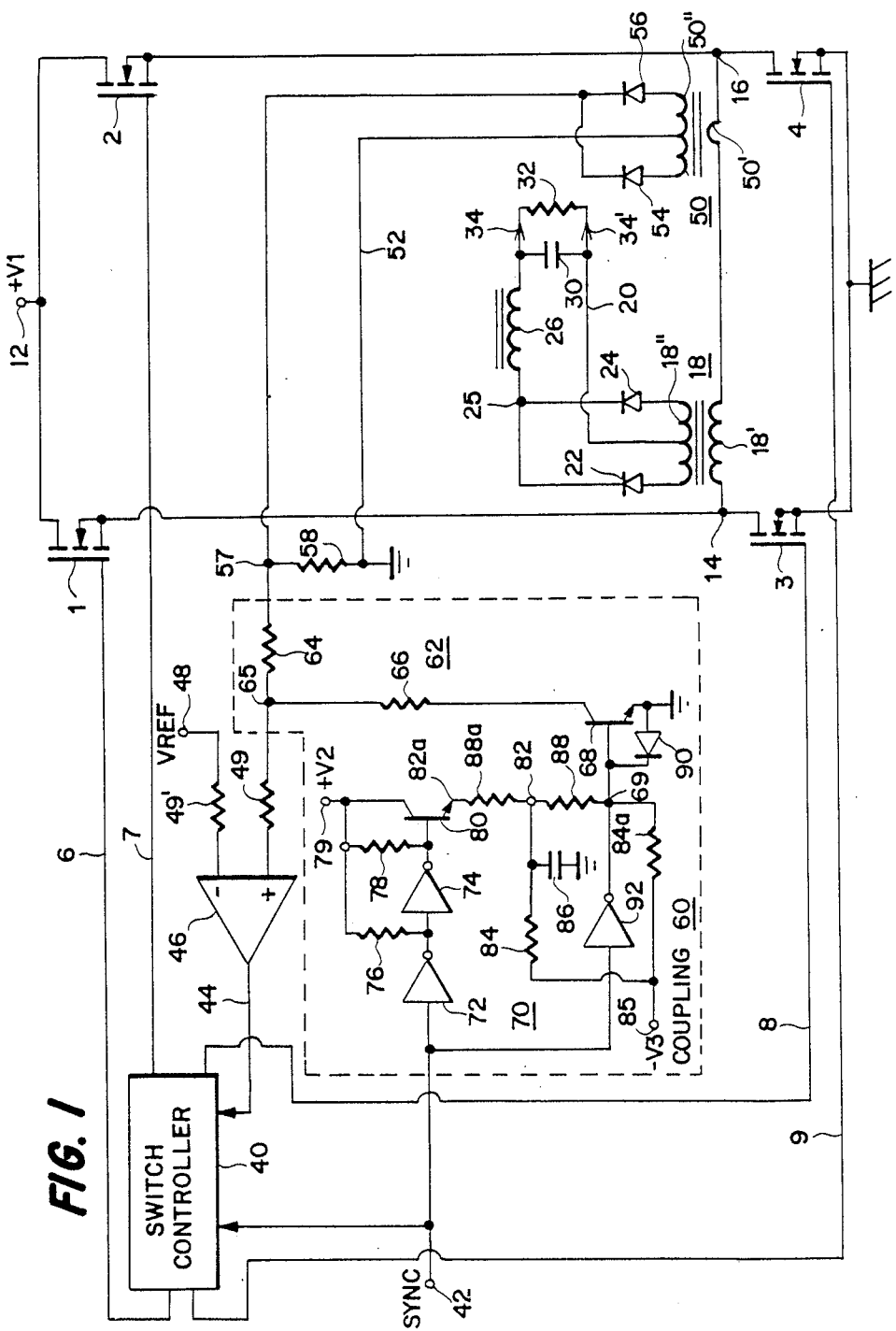
FIG. 1 is a simplified diagram in block and schematic form of a dc-to-dc converter in accordance with the invention, in which the control switch includes FETs in a bridge arrangement and which also includes a transformer coupled to receive drive from the FETs, and in which the current sense arrangement also includes a transformer.

FIG. 1 illustrates a dc-to-dc converter in accordance with the invention. In FIG. 1, field-effect transistors 1, 2, 3 and 4 are connected in a bridge arrangement. The main current-carrying source-to-drain paths of FETs 1 and 3 are serially connected between a terminal 12 and ground with a node 14 therebetween, and the main current-carrying source-to-drain paths of FETs 2 and 4 are also serially connected between terminal 12 and ground, with a node 16 therebetween. A positive voltage +V1 is applied to terminal 12 relative to ground. A primary winding 18' of a power transformer 18 is connected between nodes 14 and 16 for receiving alternating voltage as a result of cyclical operation of switches 1-4.

Application of alternating voltage to primary winding 18' of transformer 18 produces an alternating voltage across a secondary winding 18" which includes a center tap connected to a conductor 20. One end of secondary winding 18" is connected to the anode of a semiconductor rectifier 22, and the other end of secondary winding 18" is connected to the anode of a similar rectifier 24. The cathodes of rectifiers 22 and 24 are connected together at a node 25, which is connected to one end of an inductor 26. A capacitor 30 is connected between conductor 20 and the end of inductor 26 remote from node 25. A load or utilization apparatus illustrated as a resistor 32 may be coupled across capacitor 30 by way of connectors 34, 34'. As known to those skilled in the art, application of an alternating voltage to primary winding 18' results in a pulsating direct voltage at node 25 relative to conductor 20. In this context, a pulsating direct voltage means a voltage which does not change polarity with respect to the reference, even though its magnitude may vary. The pulsating direct voltage at node 25 relative to conductor 20 produces a current through inductor 26 having an average value, which current produces a direct voltage across capacitor 30 which may be used to energize load 32.

A switch controller illustrated as a block 40 is connected by conductors 6, 7, 8 and 9 to the gates of FETs 1, 2, 3 and 4, respectively, for, in pairs, controlling their operation in a cyclical manner. Controller 40 receives synchronizing (sync) signals from a terminal 42 for synchronizing the cyclical operation of FETs 1-4, and also receives a current limit signal by way of a conductor 44 which is indicative of a current limit condition. Many types of switch mode operation are known. The operation of controller 40 as described in conjunction with FIGS. 2 and 3 is predicated upon operation in a current-programmed operating mode.

Figure 2:
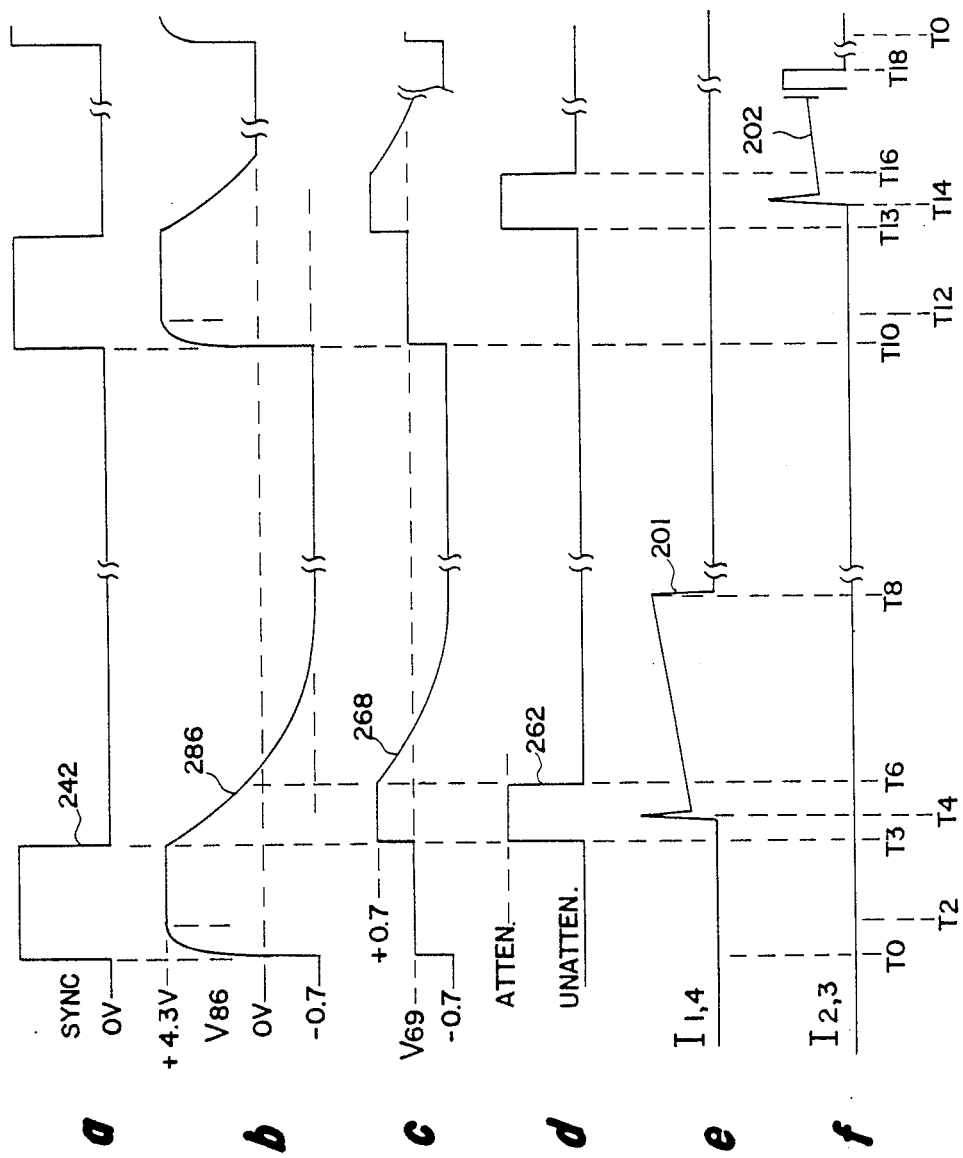
FIGS. 2a through 2f and 3a through 3c illustrate state-, voltage- or current-versus-time waveforms occurring in the arrangement of FIG. 1 during operation.
Figure 3:
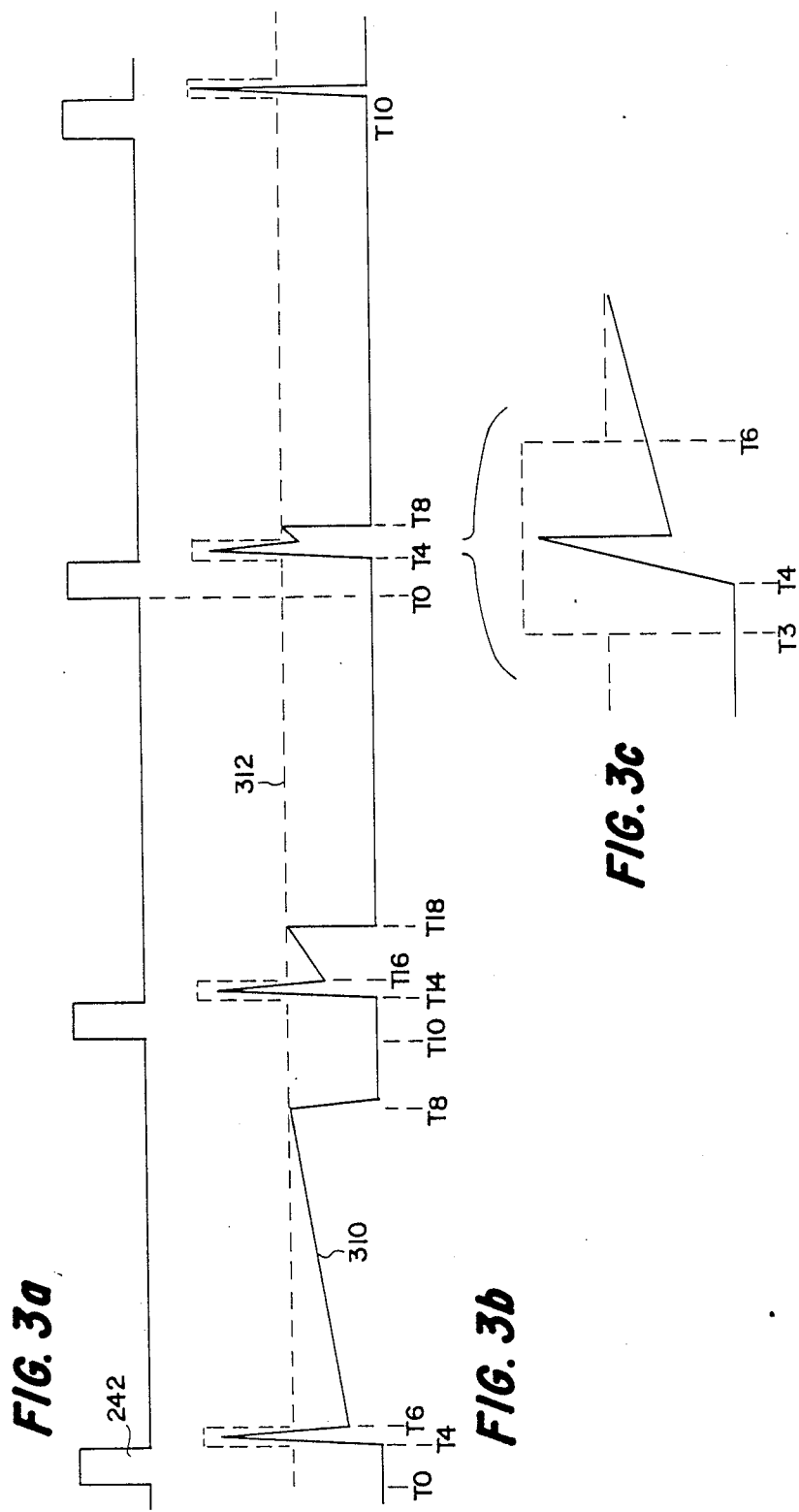

FIG. 2a illustrates as a voltage-time waveform 242 the sync signal applied to terminal 42 of FIG. 1. One complete cycle of operation occurs in the interval extending from time T0 to the next following time T0. Sync pulses 242 make excursions to a logic HIGH condition beginning at recurrent times T0 and also beginning at recurrent times T10, midway between times T0. Sync signal 242 is at a logic LOW level for a period of time preceding each excursion which begins at times T0 and T10. At each recurrent time T3, sync pulse 242 returns to a logic LOW level, and switch controller 40 responds at a time T4 (i.e., after a delay from T3 to T4) by gating FETs 1 and 4 into conduction (an ON state), while maintaining FETs 2 and 3 in a nonconductive (OFF) state. The delay between times T3 and T4 is due to propagation delay in controller 40 and to the time required for charging the gate-to-source capacitance of the FETs being controlled from zero volts to their threshold voltages. The operating states of FETs 1 and 4 is suggested in FIG. 2e by waveform 201, which represents the general magnitude of the current flow through FETs 1 and 4, and through primary winding 18' of transformer 18. Similarly, waveform 202 of FIG. 2f suggests the magnitude of the current through FETs 2 and 3, which is zero immediately before and after time T4. In general, the current through each pair (1, 4; 2, 3) of FETs during their conductive periods is a ramp of increasing magnitude with time. The ramp current 201 represented in FIG. 2e increases from time T4 until switch controller 40 receives a signal on conductor 44 representative of a current magnitude limit. In FIG. 2, the current limit signal occurs at a time T8. At time T8, switch controller 40 turns FETs 1 and 4 OFF. FETs 2 and 3 remain OFF until a time T14 following the lagging edge of the next following sync pulse, which occurs at time T13. With both sets of FETs OFF in the interval T8–T14, no voltage is applied across primary winding 18' of transformer 18.

At time T14 following the time T13 of the lagging edge of the next following sync pulse (waveform 242 of FIG. 2a), FETs 2 and 3 are turned ON to apply voltage across primary winding 18' with a polarity reversed from that applied during the interval T4–T8. A ramp current of increasing magnitude begins to flow through FETs 2, 3 as illustrated by waveform 202 after time T14. The ramp of current increases until a later time T18 at which a current limit signal is applied over conductor 44 to switch controller 40. After time T18, controller 40 maintains FETs 1–4 nonconductive until the next following time T4, whereupon the cycle as described above begins again. Switch controllers such as 40 are well known in the art and no further description is necessary.

In FIG. 1, the primary winding 50' of a current transformer 50 is serially connected with primary winding 18'. Current transformer 50 includes a center-tapped secondary winding 50". The center tap of secondary winding 50" is connected to ground by way of a conductor 52. One end of secondary winding 50" is connected to the anode of a rectifier 54, the cathode of which is connected to a node 57. The other end of secondary winding 50" is connected to the anode of a rectifier 56, the cathode of which also is connected to node 57. A resistor 58 is connected between node 57 and ground. As is known to those skilled in the art, flow of alternating current through primary winding 18' of transformer 18 as a result of the above-described operation of FETs 1–4 results in a voltage or signal across resistor 58, the magnitude which is representative of the magnitude of the current through primary winding 18'.

The current-representative signal developed across resistor 58 of FIG. 1 is coupled to the noninverting (+) input terminal of a comparator 46 by way of a resistor 49 and by a coupling arrangement designated generally as 60. Comparator 46 compares that portion of the current-representative signal which is coupled to its +input terminal with a reference voltage (VREF) applied from a terminal 48 by way of a resistor 49' to the inverting (−) input terminal. When the magnitude of the signal applied to the +input terminal exceeds the magnitude of reference voltage VREF, comparator 46 switches and produces a current limit signal on conductor 44 for application to switch controller 40.

Coupling arrangement 60 of FIG. 1 includes a nonswitched voltage divider designated generally as 62 connected between node 57 and ground. Switched attenuator 62 includes a first or series resistor 64, one end which is connected to node 57 and the other end of which is connected to a node 65. Voltage divider 62 also includes as a shunt element the series combination of a second resistor 66 serially connected with the collector-to-emitter path of a bipolar NPN transistor 68 to form a switched resistor, which is connected between node 65 and ground.

Coupling arrangement 60 of FIG. 1 also includes a drive circuit designated generally as 70 for driving the base of transistor 68 in response to the sync signals applied to input terminal 42. Drive circuit 70 includes a cascade of two inverting circuits 72, 74, together with their associated pull-up or collector resistors 76, 78. The output of inverting circuit 74 is applied to the base of a bipolar NPN transistor 80, the emitter of which is connected by way of a node 82a and an oscillation suppression resistor 88a to a node 82. Resistors 76 and 78, and the collector of transistor 80, are connected by a terminal 79 to a source +V2 of positive energizing voltage. Node 82 is connected by way of a resistor 84 to a terminal 85 which is a source of negative energizing potential −V3. Node 82 is also connected by way of a capacitor 86 to ground. Node 82 is further connected by way of a resistor 88 and a node 69 to the base of transistor 68. The cathode of a diode 90 is connected to node 69 and its anode is connected to ground. A further inverting circuit 92 is connected to receive sync signal from input terminal 42, and its output is connected to node 69 and to the base of transistor 68. Inverting circuit 92 has an "open collector output," and does not include a pull-up resistor, so its output is effectively open-circuited during those intervals during which its input signal has a logic LOW level.

During those intervals of the recurrent cycle in which switch controller 40 maintains FETs 1–4 nonconductive, current continues to flow through inductor 26 as its magnetic fields collapse. The current flows through capacitor 30 and through load resistor 32. This current flow holds rectifiers 22 and 24 in a conductive state even when FETs 1–4 are OFF. With diodes 22 and 24 in a conductive state, charge carriers are stored therein, thereby rendering them capable of reverse conduction. At the instant T4 or T14 at which a pair of FETs 1, 4 or 2, 3 is rendered conductive in delayed response to the lagging edge of a sync pulse 242, voltage is suddenly applied across primary winding 18' of transformer 18, and results in the generation of voltage across secondary winding 18". At the instant at which voltage appears across secondary winding 18', both rectifiers 22 and 24 are capable of conducting in the reverse direction. A large spike of current flows through the loop including secondary winding 18", rectifiers 22 and 24 and node 25, until the charge carriers are swept out in that one of rectifiers 22 and 24 which is reversed biased. That diode in which the charge carriers are swept out then becomes nonconductive, and the current spike ends. During this current spike, a current spike also flows through primary winding 18'. The current spike is illustrated in FIG. 2e immediately after time T4, and in FIG. 2f immediately after time T14. The current spike is sensed by the current sense circuit including transformer 50 and resistor 58. As a result, a spike of the current sense signal appears at node 57 relative to ground immediately after times T4 and T14. If this spike is applied directly to the noninverting input terminal of comparator 46 by resistors 49 and 64, comparator 46 may switch, and switch controller 40 may undesirably turn OFF the associated FETs at a time unrelated to the magnitude of the ramp portion of the current flow through primary winding 18'.

The above-described problem is solved by coupling circuit 60. In general, coupling circuit 60 renders transistor 68 conductive for a predetermined interval bracketing (preceding, including and following) each of times T4 and T14, thereby causing resistor 64 to become part of voltage divider 62 which includes resistor 66. As a result, the current sense voltage at node 57 is attenuated as it appears at node 65 for application by way of resistor 49 to the noninverting input of comparator 46. Resistor 49 does not introduce further attenuation because of the high input impedance of the +input terminal of comparator 46. The attenuation introduced by voltage divider 62 is such that the current spike does not cause comparator 46 to switch. However, a short-circuit attributable to a defect, having a magnitude slightly larger than the current spike, will nevertheless cause comparator 46 to switch, thereby producing on conductor 44 a current limit signal which will cause switch controller 40 to switch the then-conducting FETs to the nonconductive state to protect against the overcurrent condition.

In order that a description of the operation of coupling circuit 60 may be more completely understood, the following explanation is based upon an example in which diode 90 and transistors 68 and 80 are silicon units with forward offset potentials of about 0.7 volts, and in which the important values are:

| source | +V2 | +5 | volts |
|---|---|---|---|
| | +V3 | −5 | |
| Resistor | 76 | 2K | ohms |
| | 78 | 2K | |
| | 84 | 1K | |
| | 84a | 2.7K | (also known as 2K7) |
| | 88 | 1K8 | |
| | 88a | 39 | |
| capacitor | 86 | 680 | picofarads |

The operation of coupling circuit 60 is the same whether during the first half (times T0–T10) or the second half (times T10–T0) of an operating cycle. Operation will only be explained in the interval T0–T10, the remainder of the operation being understood therefrom.

At times immediately before recurrent times T0 (FIG. 2 sync signal 242 (FIG. 2 applied to sync input terminal 42 (FIG. 1) is at a logic LOW level, so the output voltage of inverting circuit 74 is also at a logic low level, and transistor 80, which is an emitter follower, sets node 82a at about −0.7 V. At the same time, inverting circuit 92 has an open-circuit output. As a result, conventional current flows from ground through diode 90, and through resistor 84a to the −V3 supply, resulting in −0.7 V at node 69. Resistors 88a and 88 are effectively in parallel at this time. They form a voltage divider with resistor 84 which establishes the exact voltage across capacitor 86, which can be determined by linear superposition. Because the parallel combination of resistors 88a and 88 is much lower in value than resistor 84, the voltage at node 82 is essentially −0.7 V immediately preceding times T0 and T10. This voltage across capacitor 86 is illustrated by that portion of waveform 286 of FIG. 2b at times immediately preceding times T0 and T10. With diode 90 conducting, the base-emitter junction of transistor 68 is reverse-biased to 0.7 volts (for a Silicon diode) as illustrated by waveform 268 of FIG. 2c at times preceding time T0, so the collector of transistor 68 appears as a high impedance. Under this condition, the current sense signal voltage is applied substantially unattenuated from node 57 to the +input terminal of comparator 46 at times before time T0, as shown by state waveform 262 of FIG. 2d. Any current surge causing the current sense signal voltage as applied to the +input terminal of comparator 46 to exceed the VREF voltage at terminal 48 will switch comparator 46, resulting in shut-down of the converter.

At time T0 (FIG. 2) sync pulse 242 (FIG. 2a) makes an excursion to a logic HIGH level, and remains at that level until time T3. With sync pulse 242 HIGH, the open collector output of inverting circuit 74 is also logic HIGH or in the off state, and transistor 80 is rendered conductive as an emitter follower, with an output voltage of about 4.3 volts. This charges capacitor 86 toward +4.3 volts, as illustrated by waveform 286 of FIG. 2b in the interval T0–T2. With the sync pulse at a logic HIGH level, inverting circuit 92 is at a logic LOW level, thereby sinking current flowing through resistor 88 from node 82, thereby effectively setting the base of transistor 68 to zero volts, as illustrated in the interval T0–T3 in FIG. 2c. This renders diode 90 nonconductive, and also maintains the base-emitter junction of transistor 68 unbiased, and its collector at a high impedance. Voltage divider 62 continues to be disabled, so the current sense signal applied from node 57 to the +input of comparator 46 is not attenuated in the interval T0–T3, as illustrated by the UNATTEN condition of state waveform 262.

At time T3, sync pulse 242 (FIG. 2a) makes a transition from logic HIGH to a logic LOW level. Transistor 80 (FIG. 1) becomes, nonconductive as its base-emitter junction becomes reverse-biased, and inverting circuit 92 assumes an open-collector condition. In the first instant after time T3, capacitor 86 is charged to a voltage of +4.3 V, as illustrated by waveform 286 of FIG. 2b. After time T3, capacitor 86 progressively discharges through resistor 84 to terminal 85, and its voltage decreases until the value of −0.7 volts is ultimately reached. In the interval T3–T6, capacitor 86 also discharges through resistor 88 and the base-emitter junction of transistor 58, thereby turning transistor 68 ON, thereby effectively grounding resistor 66 and enabling voltage divider 62 for attenuating the current sense signal voltage applied from node 57 to the + input terminal of comparator 46. At this time the spiked portion of the current sense signal is attenuated so that ordinary recurrent spikes do not cause comparator 46 to switch. A typical attenuation may be 6 dB (i.e. ½).

At time T6, the discharge of capacitor 86 toward −0.7 volts has lowered the capacitor voltage below the level necessary to maintain forward bias of the base-emitter junction of transistor 68. Therefore, transistor 68 becomes nonconductive beginning at time T6, thereby disabling voltage divider 62. With voltage divider 62 disabled, the current sense signal voltage generated at node 57 is once again coupled to comparator 46 essentially unattenuated. The unattenuated state continues from time T6 until time T13 of the second half of the cycle.

FIG. 3b illustrates a magnitude-time waveform 310 representing the current through primary winding 18' and 50' of FIG. 1 during operation in a current-programmed mode, with sync pulses 242 re-illustrated in FIG. 3a for convenient reference. As illustrated, the ramps of current are of decreasing duration, representing for example rapidly increasing input voltage concurrent with rapidly increasing load current. In the case of a decreasing input voltage condition, the ON times of switch pairs 1, 4; 2, 3 increase. As known, their conductive times cannot be allowed to reach 50% without the danger of damage due to the momentary formation of a direct path from voltage source 12 (FIG. 1) to ground.

FIG. 3c illustrates a portion of FIG. 3b to an expanded time scale. As illustrated, the times (T8, T18) at which the ramp of current ends occurs when the current magnitude reaches a limit value illustrated as dotted line 312. The effective current limit value in the intervals T3-T6, T13-T16 is greater than that occurring during the remainder of each cycle, so that shut-down is not triggered even though the magnitude of the current spike in the intervals T3-T6, T13-T16 is greater than the magnitude of the ramp current required for temporary shut-off (at times T8, T18).

As described, coupling 60 attenuates the current sense signal applied to comparator 46 for the intervals T3-T6 during each first half-cycle of operation, and equivalently for the interval T13-T16 in the second half-cycle. These intervals encompass the times during which a current surge occurs due to application of reverse voltage to semiconductor rectifiers which are momentarily rendered bidirectionally conductive by stored charge. The attenuation reduces the magnitude of the current sense signal applied to the comparator to a value which is less than the reference value, so that the current spike occurring due to normal operation will not trigger shut-down.

A desirable attribute of the described arrangement is that a fault-related increase in magnitude of the current sense signal may nevertheless be sufficient to trigger shut-down even if it occurs during the period of attenuation. During intervals of the operating cycle other than the intervals T3-T6 and T13-T16, the current sense signal is applied in unattenuated form to the comparator, so that a fault may desirably result in shut-down even if the resulting current surge is smaller in magnitude than the current surge due to charge storage in the rectifiers. The path by which the current sense signal is coupled to the comparator is not required to include low-pass filters which might undesirably introduce delay. As known, delay in feedback loops is undesirable and may even lead to instability.

Figure 4:
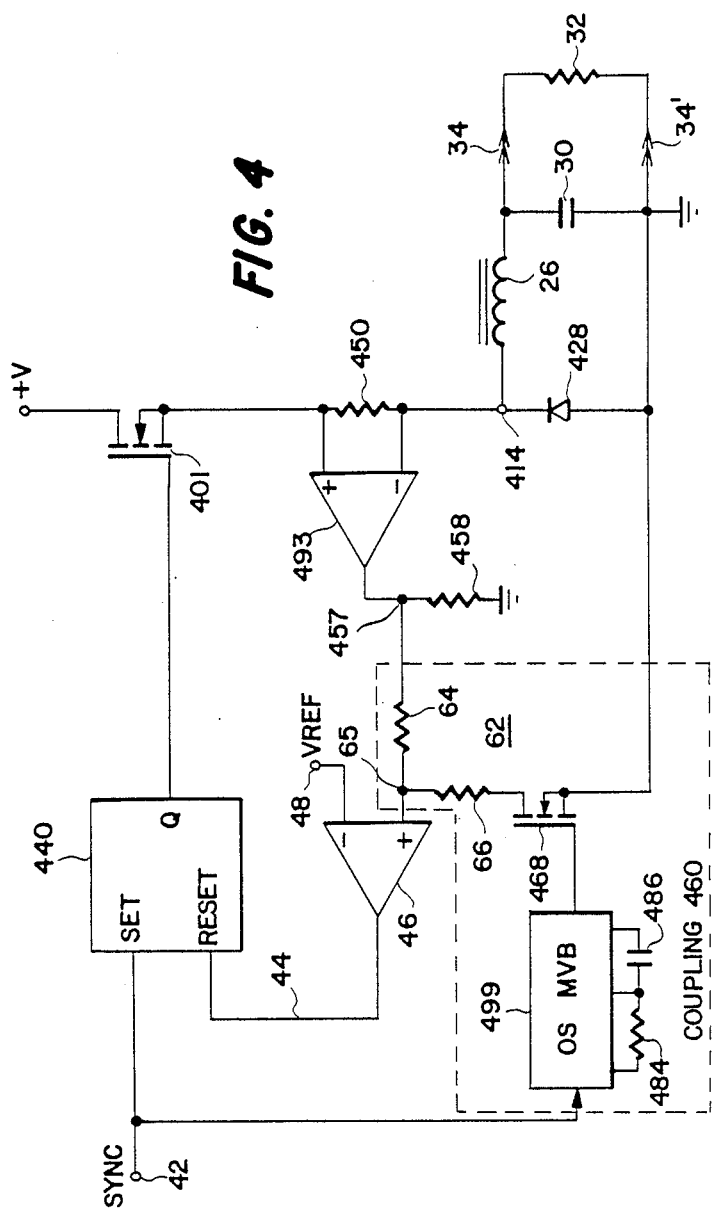
FIG. 4 illustrates another dc-to-dc converter in accordance with the invention in which a single controllable switch is used without a transformer, and in which the current sense arrangement includes a resistor.

FIG. 4 illustrates an embodiment of the invention in simplified schematic form. Elements of FIG. 4 corresponding to those of FIG. 1 are designated by the same reference numerals, and elements having generally analogous functions are designated by the same reference numerals in the 400 series. In FIG. 4, inductor 26 and rectifier 428 are connected at a node 414 with a FET switch 401 in the well known switched buck configuration. A resistor 450 connected between switch 401 and node 414 generates a voltage which depends upon the magnitude of the current flow through switch 401. A differential amplifier 493 performs a level-shifting function and may provide amplification to produce the current-representative signal voltage across a resistor 458, which is applied by a coupling 460 to the + input of comparator 46. Comparator 46 compares the signal coupled to its + input with the reference voltage generated at terminal 48 to produce a current limit signal on conductor 44 and at the reset (R) input of a set-reset flip-flop (FF) 440. Sync pulses applied to an input terminal 42 are coupled to the set (S) input of FF 440, and its output is coupled to the gate of FET 401. In operation, the sync pulse sets FF 440, which responds by gating FET 401 into conduction for causing an increasing ramp current through inductor 26. The ramp current is integrated by capacitor 30 for generating voltage for load 30. When the current through FET 401 and resistor 450 is sufficient, comparator 46 produces a current limit signal on conductor 44 which resets FF 440 to turn FET 401 OFF. Current continues to flow through inductor 26, however, which causes "catch" or "freewheeling" diode 428 to conduct, thereby resulting in storage of charge carriers therein. During the next following cycle, when FET 401 becomes conductive, a current surge occurs because diode 428 is momentarily a short-circuit during the interval in which the charge carriers are swept out. The current surge is attenuated during this interval by voltage divider 62 of coupling 460. Voltage divider 62 includes controllable switch FET 468 controlled by a one-shot multivibrator (OS MVB) 499 which is triggered by sync applied to terminal 42. Multivibrator 499 maintains FET 468 conductive for a period of time established by timing resistor 484 and timing capacitor 486. The period of time is selected to encompass the duration of the normal-operation current surge.

Figure 5:
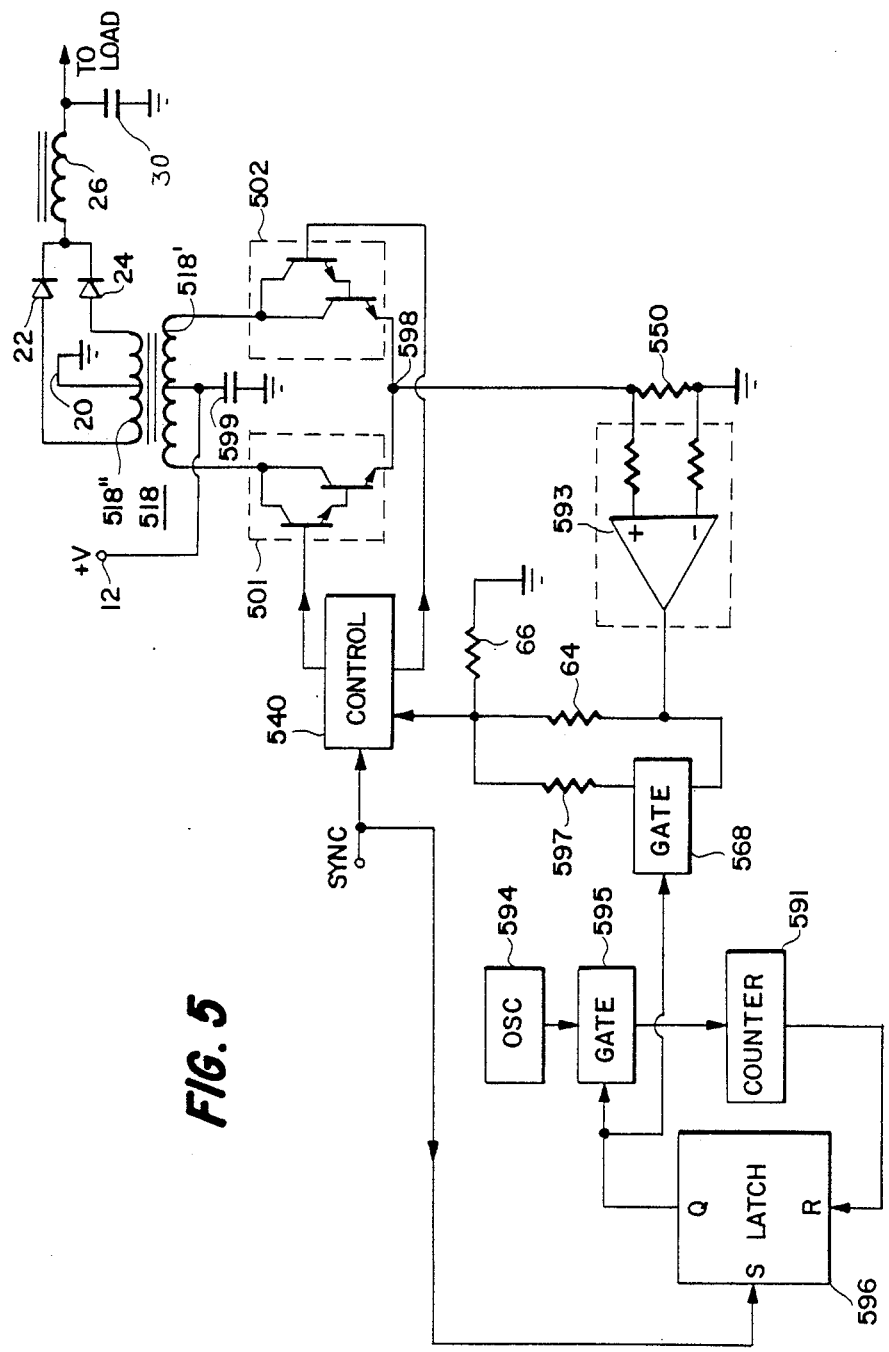
FIG. 5 illustrates another dc-to-dc converter in accordance with the invention in which a pair of push-pull controllable switches are used in conjunction with a transformer, and in which the current sense circuit includes a resistor connected at one end to ground.

The arrangement of FIG. 5 is a simplified diagram in schematic and block form of another embodiment of the invention. In FIG. 5, elements corresponding to those of FIG. 1 are designated by the same reference numbers, and elements with generally analogous functions are designated by the same reference numbers in the 500 series. In FIG. 5, transformer 518 with primary and secondary windings 518' and 518", respectively, is identical to transformer 50 of FIG. 1, except that primary winding 518' has a center-tap. The center-tap is connected across a capacitor 599 to terminal 12. This allows push-pull operation by means of only two controllable switches, 501 and 502, which are illustrated as bipolar Darlingtons. Switch 501 is connected to one end of primary winding 518', and switch 502 is connected to the other end. Both switches 501 and 502 are connected together at a node point 598, which is coupled to ground by way of a low resistance current-sensing resistor 550. This type of connection avoids the need for a level shifting circuit. An amplifier illustrated as 593 has inputs connected across resistor 550, and couples amplified current sense signal by way of a resistor 64 to a switch control circuit 540. Instead of controlling the resistance of a shunt leg of a voltage divider as in FIGS. 1 and 4, the arrangement of FIG. 5 controls the series leg of a voltage divider including resistors 64 and 66. A resistor 597 is coupled in parallel with resistor 64 by a controllable gate 568. Gate 568 is controlled by the output of a set-reset latch 596 which is set at each sync pulse. The output also enables a gate 595 which couples clock signals from an oscillator 594 to a counter 591. Counter 591 resets latch 596 at a predetermined count to thereby close gates 595 and 568.

Other embodiments of the invention will be apparent to those skilled in the art. For example, instead of controlling a switchable attenuator to obtain a change in level of the current sense signal, the gain of a controllable-gain amplifier (also known as an AGC amplifier) may be adjusted. While operation of a current-programmed source has been described, even voltage mode control loops with cycle-to-cycle current sensing for current-limiting may have the described problem, which may be solved in the same general manner as that described.

What is claimed is:
1. A current limited power supply, comprising:
inductance means adapted to be coupled to a load;
rectifying means coupled with said inductance means to form a circuit combination including at least one path by which current flowing in said rectifying means can flow through said inductance means;
controllable switch means coupled to said circuit combination and adapted to be coupled to a terminal of a source of direct energizing potential for, during a first operating condition of a recurrent cycle of operating conditions, applying direct energizing potential to said circuit combination in such a polarity as to generate an average unidirectional current flow through said inductance means for energizing said load, and for, during a second operating condition of said recurrent cycle of operating conditions, applying no direct energizing potential to said circuit combination by way of said controllable switch means;

a source of synchronizing signals;

control means coupled to said controllable switch means and to said source of synchronizing signals, said control means including a current limit signal input terminal, for recurrently initiating said first operating condition of said cycle of operating conditions at a recurrent first time in response to said synchronizing signals, and for recurrently initiating said second operating condition in response to a current limit signal applied to said current limit signal input terminal;

current sensing means coupled to one of said controllable switch means and said inductance means for generating a current sense signal representative of the magnitude of the flow of current therethrough;

comparison means coupled to said current limit signal input terminal of said control means, said comparison means including an input terminal, for comparing a signal applied to said input terminal with a fixed reference signal for generating said current limit signal when the magnitude of said signal applied to said input terminal has a particular relationship to the magnitude of said reference signal, and for applying said current limit signal to said current limit signal input terminal of said control means; and coupling means coupled to said current sensing means and to said input terminal of said comparison means for coupling said current sense signal to said input terminal of said comparison means with a reference attenuation during at least the last portion of said first operating condition, said coupling means further comprising controllable attenuation means coupled to said current sensing means, to said source of synchronizing signals and to said current limit signal input terminal of said control means for attenuating said current sense signal relative to said reference attenuation for a period of time beginning at said first time.

2. A supply according to claim 1, wherein:
said controllable attenuation means comprises second switch means serially coupled with first resistance means to form a series combination coupled to said input terminal of said comparison means; and further comprising timing means coupled to said source of synchronizing signals and to said second switch means for enabling said second switch means for conduction for a predetermined time following said first time.

3. A supply according to claim 2, further comprising second resistance means coupled to said current sensing means and to said input terminal of said comparison means, for forming a resistive attenuator during those intervals in which said second switch means is conductive.

4. A supply according to claim 1, wherein:
said controllable switch means is coupled to the juncture of said rectifying means and said inductance means, and said rectifying means is adapted to be coupled to a second terminal of said source of direct operating potential, thereby forming a buck arrangement; and capacitance means coupled to said inductance means at a point remote from said juncture for inteqrating said unidirectional current flow for forming a direct voltage across said load.

5. A supply according to claim 1, further comprising:
transformer means including a primary winding coupled to said controllable switch means and a secondary winding coupled to said circuit combination.

6. A supply according to claim 5, wherein said controllable switch means comprises first and second switches adapted to be coupled in series across said source of direct energizing potential with a first node therebetween, and third and fourth switches also adapted to be coupled in series across said source of direct energizing potential with a second node therebetween; and wherein said primary winding of said transformer means is coupled between said first and second nodes.

7. A supply according to claim 6 wherein said secondary winding is center-tapped, and said rectifying means comprises first and second rectifiers, each including an anode and a cathode, one of said anodes and cathodes of said first and second rectifiers being coupled together and to one end of said inductance means, the other one of said anode and cathode of said first rectifier being coupled to one side of said secondary winding, and the other one of said anode and cathode of said second rectifier being coupled to the other side of said secondary winding.

8. A supply according to claim 5 wherein said current sensing means comprises a transformer winding.

9. A supply according to claim 8 wherein said transformer winding is coupled in series with said primary winding; and further comprises:

a current sense secondary winding magnetically coupled to said transformer winding; and second rectifying means coupled to said current sense secondary winding for generating said current sense signal.

10. A supply according to claim 5, wherein:
said controllable switch means comprises first and second controllable power switches serially coupled at a node; and wherein said primary winding is center-tapped, said center-tap being adapted to be coupled to said terminal of said source of direct energizing potential, and the ends of said primary winding remote from said center-tap each being coupled to said node by one of said first and second controllable power switches, said node being adapted to be coupled to a second terminal of said source of direct energizing potential.

11. A control circuit, comprising:
a transformer including primary and secondary windings;

controllable switch means coupled to said primary winding and adapted to be coupled to a source of direct electrical energy for initiating at least first and second operating conditions during first and second states, said first state applying said direct electrical energy to said primary winding in a selected polarity;

a source of synchronizing signals;

control means coupled to said source of synchronizing signals and including a comparator signal input terminal, and adapted for recurrently setting said controllable switch means into said first operating condition at recurrent first operating times in response to said synchronizing signals, and for setting said controllable switch means into said second operating condition in response to a comparator signal applied to said comparator signal input terminal;

current sensing means coupled to said transformer for sensing the magnitude of an electrical parameter associated with application of said direct electrical energy to said primary winding and for generating a limit signal;

comparator means coupled to receive a fixed reference signal and including an input terminal adapted to receive a control input signal for generating said comparison signal when said control input signal exceeds said fixed reference signal;

rectifying means coupled to said secondary winding of said transformer and adapted to be coupled to load means for rectifying alternating current produced thereby as a result of recurrent operation of said controllable switch means among said operating conditions under the control of said control means for producing rectified current and for applying said rectified current to said load means, said rectifying means including an inherent capacitance which results in a high current in said sensing means for a period after said first operating time;

coupling means coupled to said current sensing means and to said input terminal of said comparator means for coupling therebetween, said coupling means further including controllable attenuation means coupled to said source of synchronizing signals for being operated into a state of attenuation in response to said synchronizing signals for at least said period after said first times.

12. A current limited power supply, comprising:

inductance means adapted to be coupled to a load;

rectifying means coupled with said inductance means to form a circuit combination including at least one path by which current flowing in said rectifying means can flow through said inductance means;

controllable switch means coupled to said circuit combination and adapted to be coupled to a terminal of a source of direct energizing potential for, during a first operating condition of a recurrent cycle of operating conditions, applying direct energizing potential to said circuit combination in such a polarity as to generate an average unidirectional current flow through said inductance means for energizing said load, and for, during a second operating condition of said recurrent cycle of operating conditions, applying no direct energizing potential to said circuit combination by way of said controllable switch means;

a source of synchronizing signals;

control means coupled to said controllable switch means and to said source of synchronizing signals, said control means including a current limit signal input terminal, for recurrently initiating said first operating condition of said cycle of operating conditions at a recurrent first time in response to said synchronizing signals, and for recurrently initiating said second operating condition in response to a current limit signal applied to said current limit signal input terminal;

current sensing means for generating a current sense signal representative of the magnitude of the flow of current therethrough, said current sense signal including spikes recurring in response to said recurrent cycle;

comparison means coupled to said current limit signal input terminal of said control means, said comparison means including an input terminal, for comparing a signal applied to said input terminal with a fixed reference signal for generating said current limit signal when the magnitude of said signal applied to said input terminal has a particular relationship to the magnitude of said reference signal, and for applying said current limit signal to said current limit signal input terminal of said control means; and coupling means coupled to said current sensing means and to said input terminal of said comparison means for coupling said current sense signal to said input terminal of said comparison means with a reference attenuation during at least the last portion of said first operating condition, said coupling means further comprising controllable attenuation means coupled to said current sensing means, to said source of synchronizing signals and to said current limit signal input terminal of said control means for attenuating said current sense signal relative to said reference attenuation for a period of time beginning at said first time.

* * * * *